Nov. 1, 1938.                M. WAGNER                 2,135,314
                        MOTOR DRIVEN VEHICLE
                        Filed April 16, 1936            2 Sheets-Sheet 1

Inventor
Max Wagner
Attorney

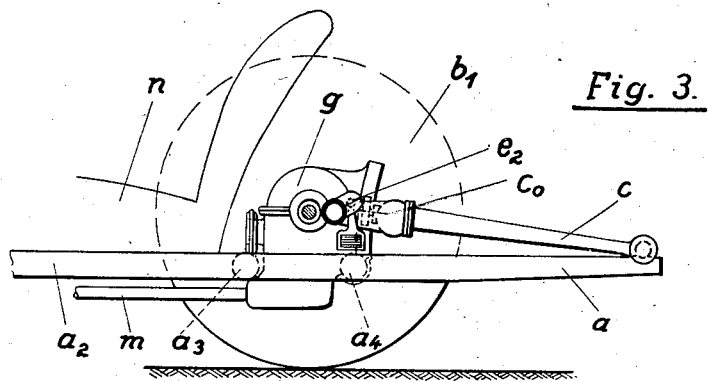
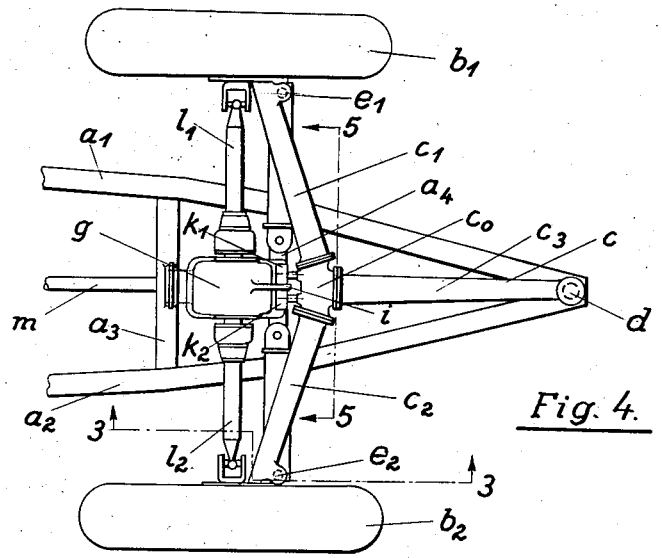
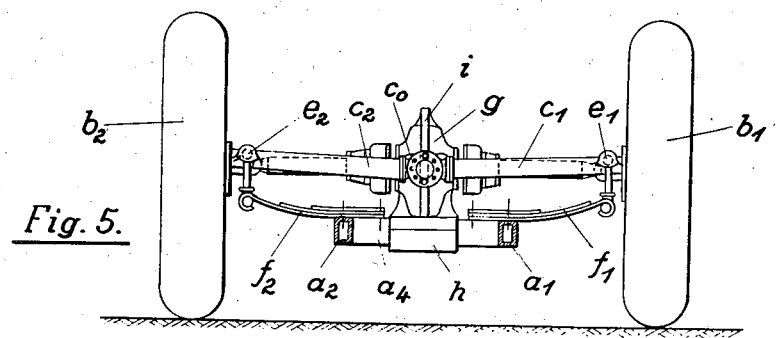

Patented Nov. 1, 1938

2,135,314

UNITED STATES PATENT OFFICE

2,135,314

MOTOR-DRIVEN VEHICLE

Max Wagner, Stuttgart, Germany, assignor to Daimler-Benz Aktiengesellschaft, Stuttgart-Unterturkheim, Germany, a company of Germany Application April 16, 1936, Serial No. 74,716
In Germany April 15, 1935

25 Claims. (Cl. 180—73)

My invention relates to a motor-driven vehicle and, more particularly, to an improved speed-change gear and to its arrangement within the chassis.

The object of my invention is to provide an improved chassis structure which results in a low position of the center of gravity and in improved riding qualities and is simple in construction and of low manufacturing cost.

Further objects are to reduce the weight of the chassis and the number of the elements and to improve the weight-distribution by arranging the speed-change gear in the rear of the chassis intermediate the rear wheels behind the passenger seats.

These and other objects which will appear from the description of a preferred embodiment following hereinafter are attained by my invention as defined in the appended claims.

According to one feature of my invention, the longitudinal drive shaft extends below the frame of the chassis, where as the transverse wheel-shafts driving the rear wheels extend above the frame. A gear box mounted on the frame includes speed-change gears and additional gears which interconnect the longitudinal drive shaft with the transverse wheel-shafts. The wheels may be carried by a rigid axle, and universal joints are inserted in the wheel shafts to permit relative motion between the frame and the wheel axle.

The means for mounting the rigid axle and for guiding it relative to the frame are disclosed and claimed in my copending application Ser. No. 56,916, filed on Dec. 31, 1935.

Figure 1:
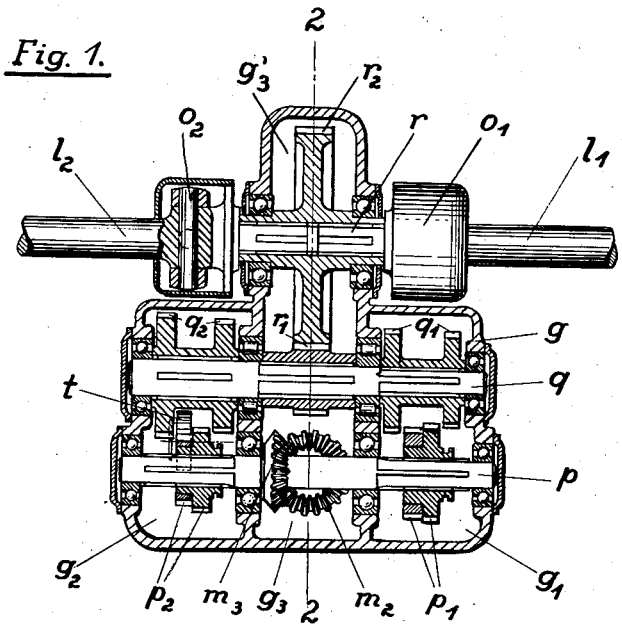
Figure 2:
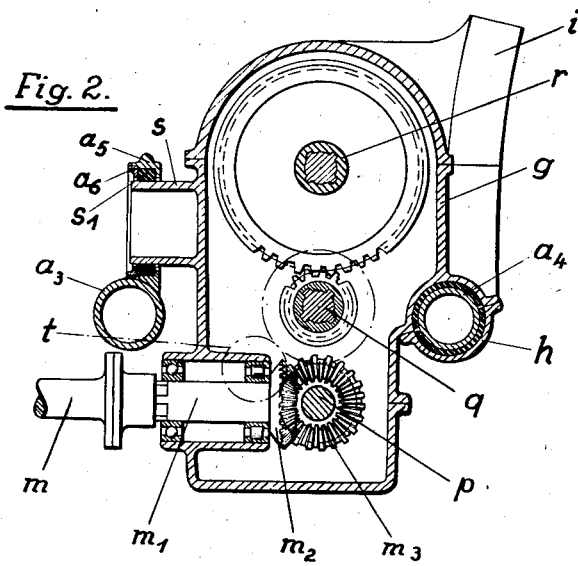

Further objects and advantages of this invention will be apparent from consideration of the specification as illustrated by the accompanying drawings of possible embodiments of the invention, in which drawings:

Fig. 1 is a section through my improved gear taken along a vertical transverse plane of the chassis, Fig. 2 is the section taken along line 2—2 of Fig. 1, Fig. 3 is an elevation of the rear end of the chassis equipped with the improved speed-change gear, partly shown in section along line 3—3 of Fig. 4, Fig. 4 is a plan-view of Fig. 3, and Fig. 5 is a rear elevation, partly in section along line 5—5 of Fig. 4.

As shown in Fig. 3, the frame of the chassis consists of two longitudinal beams $a_1$ and $a_2$ converging towards the rear and interconnected by transverse beams $a_3$ and $a_4$ which are substantially arranged all at the same level. A speed-change gear box $g$ is mounted between and carried by the transverse beams $a_3$ and $a_4$ and extends below and above the level of the frame. A longitudinal drive shaft $m$ extends from the lower end of the gear box $g$ to the motor (not shown) which is mounted in the front portion of the chassis. The rear wheels $b_1$ and $b_2$ are carried by a rigid axle composed of two tubular members $c_1$ and $c_2$ attached to a flanged member $c_0$. A strut $c_3$ is fastened to the converging ends of the frame members $a_1$ and $a_2$ by a universal joint and is rigidly attached to the flanged member $c_0$. Owing to this arrangement, the rear axle $c_0$, $c_1$, $c_2$ carrying the rear wheels is free to move relative to the frame. This motion is laterally restrained, however, by a relative guidance between the gear box $g$ and the flanged member $c_0$ within a vertical plane. To this end, the flanged member $c_0$ has two forwardly projecting studs on which rubber wheels $k_1$ and $k_2$ are journalled which embrace between them a vertical flange $i$ formed integral with or attached to the gear box $g$. The motion of the axle relatively to the frame in vertical direction is restrained by two leaf-springs $f_1$ and $f_2$. The inner ends of these leaf-springs which extend transversely to the chassis are attached to the frame members $a_1$, $a_2$ and $a_4$, whereas their outer ends are connected with the outer ends of the axle members $c_1$ and $c_2$ by spring-shackles $e_1$ and $e_2$. Wheel shafts $l_1$ and $l_2$ extend from the wheels $b_1$ and $b_2$ towards the gear box $g$ above the frame beams $a_1$ and $a_2$. Suitable universal joints $o_1$ and $o_2$ are provided to permit up and down motion of the wheels $b_1$ and $b_2$ relative to the gear box $g$.

It will be noted that, owing to the low disposition of the longitudinal drive shaft $m$, the seat $n$ may be also placed comparatively low which will result in a very low center of gravity, thereby improving the riding qualities of the vehicle. The riding qualities will be further enhanced by the improved weight-distribution resulting from the location of the change-gear in the rear of the chassis. Another advantage of my improved chassis is the fact that it lends itself particularly well to the combination with a stream-lined body.

Having now described my improved arrangement of the gear box $g$ relative to the drive shaft $m$, the wheel shafts $l_1$ and $l_2$ and the frame, I shall now proceed to describe the change gear itself.

A preferred embodiment of the change-gear is illustrated in Figs. 1 and 2. This embodiment differs slightly from that illustrated in Figs. 3, 4 and 5, as will be pointed out hereinafter.

With reference to Fig. 2, the gear box comprises a casting $g$ and a cover thereon accommodating between them ball-bearings for the horizontal hub of a spur-gear $r$. Splined gear shafts $r$ extend from the hollow hub outwardly and are connected by the universal joints $o_1$ and $o_2$ with the wheel-shafts $l_1$ and $l_2$. The universal joints may be of any well known type and, therefore, need not be described in detail.

The casting $g$ is provided with a tubular forward projection $s$ extending through a flanged upright annular member $a_5$ attached as by welding to the transverse beam $a_3$. A ring $s_1$ of rubber or similar material is inserted between the annular member $a_5$ and the extension $s$ and is held in position against the flange of the annular member by a ring $a_6$ which may be threaded into the annular member $a_5$.

The rear wall of the casting $g$ is formed with a shoulder of semi-circular cross-section bearing on a rubber sleeve surrounding the transverse beam $a_4$. A strap $h$ suitably fastened to the shoulder serves to keep it in place. Owing to this arrangement, the gear case is resiliently but firmly held in place on the transverse beams $a_3$ and $a_4$.

The interior of the gear box is subdivided by two parallel vertical partitions into three compartments designated by $g_1$, $g_2$ and $g_3$. It will be noted that the central compartment $g_3$ extends above the two lateral compartments $g_1$ and $g_2$ as indicated at $g'_3$. It will be noted from Fig. 1 that the universal joints $o_1$ and $o_2$ are positioned within the re-entrant angles formed by the tops of the lateral compartments $g_1$ and $g_2$ and by the side-walls of the upper part $g'_3$ of the central compartment $g_3$. Owing to this location, the universal joints are in sheltered position and a particularly compact arrangement results.

Gear shafts $q$ and $p$ extend parallel to each other and to the gear shafts $r$ through the side-walls of the gear box $g$ and through the partitions thereof and they are journalled therein by suitable anti-friction bearings. A pinion $r_1$ meshing with the spur-gear $r_2$ is splined to the central portion of the upper shaft $q$ within the compartment $g_3$. The longitudinal drive shaft which may be composed of two sections $m$, $m_1$ connected by a universal joint extends into a tubular portion integral with the gear box $g$ and is journalled therein by anti-friction bearings. The inner end of the member $m_1$ carries a bevel gear $m_2$ which meshes with a similar bevel gear $m_3$ splined to the shaft $p$.

A plurality of speed-change gears serve to cooperatively connect the two gear shafts $p$ and $q$ to each other at changeable ratios of transmission. One group $p_1$ and $q_1$ of these speed-change gears is located within the compartment $g_1$ and another group $p_2$, $q_2$ within the compartment $g_2$.

While the gears $q_1$ and $q_2$ are fixed on the shaft $q$, the pairs of gears $p_1$ and $p_2$ are longitudinally shiftable on the splined shaft $p$ by means (not shown) which need not be described as they are well known in the art. Parallel to the gear shaft $p$ in front thereof and at a slightly higher level, there extends a shaft through the compartment $g_2$ which carries a reversing gear $t$ which may be so shifted as to mesh with one of the gears $q_2$ and with one of the gears $p_2$ for the purpose of reversing the direction of transmission.

In the embodiment of the gear shown in Figs. 3 and 4, the upper part $g'_3$ of the compartment $g_3$ is enlarged to accommodate a differential gear which differentially connects the two gear shafts $r$ with the spur-gear $r_2$ in a manner well known in the art.

It will be noted that the various elements of the speed-change gear are substantially symmetrically arranged relative to the plane 2—2 of Fig. 1. Owing to this symmetrical arrangement, the weight is evenly distributed and a very compact and short structure is obtained. Preferably, the axes of the gear shafts $r$, $q$ and $p$ are disposed within a common vertical plane. It is owing to this arrangement that the drive shaft $m$ will be placed at a very low level in comparison with the wheel shafts $l_1$ and $l_2$.

The term "frame" as herein used is not to be understood as limited to such a device when formed separate from the body or coachwork of the vehicle, but include such devices when formed as a part of or intimately interconnected with the body or coachwork of the vehicle.

It will be noted that the construction shown and described will serve admirably to accomplish the objects stated above. It is to be understood, however, that the construction disclosed above is intended merely as illustrative of the invention and not as limiting, as various modifications thereof may be made without departing from the invention as defined by a proper interpretation of the claims which follow.

What I claim is:—

1. In a motor-driven vehicle, the combination comprising wheel supporting means, wheels mounted on said wheel supporting means, a speed-change gear-box, wheel-shafts independent of said wheel supporting means and extending from said wheels towards said speed-change gear-box in a substantially horizontal plane which intersects at least a portion of said gear-box, the latter including a plurality of gear-shafts extending substantially within a substantially vertical plane laid through said wheel-shafts, gears interconnecting said gear-shafts, and means connecting said wheel-shafts with at least one of said gear-shafts.

2. In a motor-driven vehicle, the combination comprising wheel supporting means, wheels mounted on said wheel supporting means, a speed-change gear-box, wheel-shafts extending from said wheels toward said speed-change gear-box, a drive-shaft extending to said gear-box within a plane transverse to said shafts, said gear-box including gear-shafts extending substantially within a vertical plane laid within said wheel-shafts and intersecting said transverse plane at right angles, speed-gears mounted on said gear-shafts on both sides of said transverse plane, means connecting one of said gear-shafts with said wheel-shafts, and means connecting another of said gear-shafts to said drive-shaft.

3. In a motor-driven vehicle, the combination comprising wheel-shafts, parallel gear-shafts one above the other, extending transversely to a longitudinal vertical plane of the vehicle, positioned below said wheel-shafts, and disposed substantially within a substantially vertical plane laid through said wheel-shafts, a main drive-shaft extending within said longitudinal plane, bevel-gears directly connecting one of said gear-shafts with said main drive-shaft, speed-change gears mounted on and interconnecting said gear-shafts, and means including a gearing respectively connecting the other one of said gear-shafts with said wheel-shafts.

4. In a motor-driven vehicle, the combination comprising wheel-shafts, parallel gear-shafts disposed in a substantially vertical plane and extending below said wheel-shafts transversely to a longitudinal plane of the vehicle, speed-change gears mounted on said gear-shafts on both sides of said longitudinal plane, a main drive shaft extending within said longitudinal plane, bevel-gears connecting one of said gear-shafts with said main drive shaft, and means including a gearing cooperatively connecting the other one of said gear-shafts with said wheel-shafts.

5. In a motor-driven vehicle, the combination comprising wheel-shafts, parallel gear-shafts disposed in a substantially vertical plane and extending below said wheel-shafts, one above the other transversely to a longitudinal plane of the vehicle, speed-change gears mounted on said gear-shafts on both sides of said longitudinal plane, a main drive shaft extending within said longitudinal plane, bevel-gears connecting the lower one of said gear-shafts with said main drive shaft, and means including a gearing cooperatively connecting the upper one of said gear shafts with said wheel-shafts.

6. In a motor-driven vehicle, the combination comprising wheel supporting means, wheels mounted on said wheel supporting means, wheel-shafts independent of said wheel supporting means and connected to said wheels and disposed substantially within a vertical transverse plane of said vehicle, gear-shafts arranged within said plane one above the other and below said wheel shafts, a drive shaft extending transversely to said plane, and means including shiftable speed-change gears for interconnecting said drive-shaft, said gear-shafts and said wheel-shafts with each other.

7. In a motor-driven vehicle, the combination comprising wheel supporting means, wheels mounted on said wheel-supporting means, wheel-shafts independent of said wheel supporting means and connected to said wheels and extending transversely to a longitudinal plane of said vehicle, gear-shafts arranged below said wheel-shafts and intersecting said plane, a drive-shaft extending within said plane, and means including a gearing and universal joints interconnecting said drive-shaft, said gear-shafts and said wheel-shafts with each other.

8. In a motor-driven vehicle, the combination comprising a frame, a gear-box mounted thereon, two substantially parallel partitions subdividing the interior of said gear-box into three compartments, parallel gear-shafts extending through and journalled in said partitions, speed-change gears mounted on said gear-shafts within the lateral two of said compartments, a driving-shaft below said frame, at least one driven shaft above said frame, and gears mounted within the central one of said compartments and cooperatively connecting said driving shaft and said driven shaft with said gear-shafts.

9. In a motor-driven vehicle, the combination comprising wheel supporting means, wheels mounted on said wheel supporting means, a speed-change gear-box positioned intermediate said wheels, wheel-shafts extending from said wheels towards said gear-box, a drive-shaft extending from said gear-box transversely to said shafts, two parallel partitions subdividing the interior of said gear-box into three compartments, the central one of said compartments extending above the two lateral compartments, a plurality of gear-shafts extending parallel to each other at right angles to said drive-shaft through said partitions, bearings for said gear-shafts in said partitions, speed-change gears mounted in said lateral compartments on some of said gear-shafts to gear the same to each other at changeable ratios, a pair of bevel-gears connecting said drive shaft with one of said gear-shafts and being located in said central compartment, a gearing in the upper part of said central compartment connected to another one of said gear-shafts, and universal joints connecting said gearing to said wheel-shafts and being positioned outside of said gear-box within the re-entrant angles formed by the tops of the lateral compartments and the side-walls of the upper part of said central compartment.

10. In a motor-driven vehicle, the combination comprisng a frame, a longitudinal drive-shaft extending below said frame, transverse wheel-shafts extending above said frame, and a gear-box mounted on said frame and including speed-change gears and additional gears interconnecting said drive-shaft with said wheel-shafts.

11. In a motor-driven vehicle, the combination comprising a frame composed of longitudinal and transverse beams, a longitudinal drive-shaft extending below at least one of said transverse beams, wheel supporting means, wheels mounted on said wheel supporting means, shafts connected to and extending from said wheels above said longitudinal beams, and a gear-box mounted intermediate said wheels on said transverse beams and including a speed-change gearing interconnecting said drive-shaft with said wheel-shafts.

12. In a motor-driven vehicle, the combination comprising a frame composed of longitudinal and transverse beams, wheel supporting means, wheels mounted on said wheel supporting means, at least one strut attached to said wheel supporting means and pivotally connected to said frame, wheel-shafts connected to and extending from said wheels above said longitudinal beams, a longitudinal drive-shaft extending below at least one of said transverse beams, a gear-box mounted on said transverse beams intermediate said wheels and including a speed-change gearing interconnecting said drive-shaft with said wheel-shafts.

13. The combination according to claim 1 in which said wheel supporting means comprises axle means pivotally connected to said vehicle.

14. The combination according to claim 1 in which said wheel-shafts are of equal length.

15. The combination according to claim 2 in which said wheel supporting means comprises axle means pivotally connected to said vehicle.

16. The combination according to claim 2 in which said wheel shafts are of equal length.

17. The combination according to claim 3 in which said wheel supporting means comprises axle means pivotally connected to said vehicle.

18. The combination according to claim 3 in which said wheel shafts are of equal length.

19. The combination according to claim 6 in which said wheel supporting means comprises axle means pivotally connected to said vehicle.

20. The combination according to claim 7 in which said wheel supporting means comprises axle means pivotally connected to said vehicle.

21. In a vehicle having a frame, in combination, a speed-change gear-box having a plurality of parallel shafts and attached to said frame in such a manner that the shafts lie substantially in a vertical plane transverse to the frame and the center of the gear-box lies in the central longitudinal plane of the frame, a drive shaft connected to said gear-box below said frame, wheel shafts connected to said gear-box above said frame, and speed-change gears interconnecting said gear shafts.

22. The combination according to claim 4 in which said drive shaft lies in a horizontal plane common with the lowest of said gear shafts.

23. The combination according to claim 5 in which said drive shaft lies in a horizontal plane common to the lowest of said gear-shafts.

24. The combination according to claim 1, in which said wheel shafts are connected at the upper portion of the speed-change gear box.

25. In a motor-driven vehicle, the combination comprising wheel-shafts, gear-shafts extending substantially parallel to said wheel-shafts and transversely to a longitudinal plane of the vehicle, speed-change gears mounted on said gear-shafts on both side of said plane, a main drive-shaft extending within said plane and below said wheel-shafts, bevel-gears connecting one of said gear-shafts with said main drive-shaft, means including a gearing operatively connecting another of said gear-shafts with said wheel-shafts, and a common casing including said speed-change gears, said gear-shafts, said bevel-gears and said gear.

MAX WAGNER.